United States Patent [19] | [11] 4,136,453
Levine | [45] Jan. 30, 1979

[54] ENGRAVING MACHINE

[75] Inventor: Jack W. Levine, Levittown, N.Y.

[73] Assignee: New Hermes, Incorporated, New York, N.Y.

[21] Appl. No.: 819,793

[22] Filed: Jul. 28, 1977

[51] Int. Cl.² ........................ B43L 13/10; B23Q 17/00

[52] U.S. Cl. .................................. 33/21 R; 33/24 B; 33/25 D; 90/13.6

[58] Field of Search ............ 33/18 B, 21 R, 22, 23 R, 33/23 H, 23 K, 24 R, 24 B, 25 R, 25 D; 90/62 R, 13.1, 13.6, 13.3, 13.9

[56] References Cited

U.S. PATENT DOCUMENTS 2,562,269 7/1951 Gruettner et al. .................. 33/24 B
2,703,455 3/1955 Green .................................. 33/23 R

FOREIGN PATENT DOCUMENTS 528946 11/1940 United Kingdom .................. 33/25 D

*Primary Examiner*—Richard E. Aegerter
*Assistant Examiner*—John W. Shepperd
*Attorney, Agent, or Firm*—Seidel, Gonda & Goldhammer

[57] ABSTRACT

An engraving machine is disclosed for engraving articles in a manner which automatically causes relative rotation between an engraving tool and the article support means as a function of the width of a digit (letter of alphabet or numeral) to be engraved so that digits may be engraved on the article with uniform space between digits regardless of the width of the digit.

8 Claims, 6 Drawing Figures

ENGRAVING MACHINE

BACKGROUND

Engraving apparatus for engraving articles in a manner whereby relative rotation is caused between the engraving tool and the article to be engraved when changing from one digit to another is known as per U.S. Pat. No. 2,562,269 and my copending application Ser. No. 808,508 filed on June 6, 1977. In said patent, each time a different letter of the alphabet or numeral is to be engraved, relative rotation is caused between the engraving tool and the article to be engraved by a preselected uniform amount. In a typical prior art device, such relative rotation is uniformly in an amount corresponding to four teeth on a gear.

In conventional digits which are engraved, that is letters of the alphabet and/or numerals, some digits are wider than others. Thus, the letter "I" requires less space than "A" which in turn requires less space than "M". In such prior art devices, letters such as "M" are contracted so as to be narrower than that which is required for good alphabet design. The present invention solves this problem of the prior art by structurally interrelating an engraving machine in a manner so that there is an automatic compensation for the difference in the widths of various digits such as letters or numerals so that less such relative rotation is caused when it is desired to engrave the letter "I" as compared with the letter "A" which in turn is less than that required when engraving "M".

SUMMARY OF THE INVENTION

The present invention is directed to an engraving machine which includes a frame supporting a tool for engraving an article having a curved surface. A means is provided for supporting the article to be engraved in a position adjacent said tool. Further, a means is provided on the frame for automatically causing relative rotation between said tool and said supporting means as a function of the width of a digit to be engraved so that digits may be engraved on the article with uniform space between digits regardless of the width of the digits.

In a preferred embodiment of the present invention, the digits are circumferentially disposed on a rotatable dial supported by the frame. A slide finger is radially disposed with respect to said dial and has a pin positioned to enter a groove or slot on the dial associated with each of the digits. The groove or slot is of a different radial length depending upon the width of the digit. A single actuator is provided for simultaneously causing relative rotative movement between the engraving tool and the article to be engraved while moving the slide finger radially with respect to the dial as a function of the length of the groove or slot.

It is an object of the present invention to provide an engraving machine structurally interrelated in a manner so that it may sequentially engrave digits on an article with uniform spaces between the digits regardless of the width of the digits.

It is another object of the present invention to provide an engraving machine which automatically engraves digits of different widths on an article regardless of the width of the digits while providing for uniform space between the digits and without the need for expert skill on the part of the operator.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
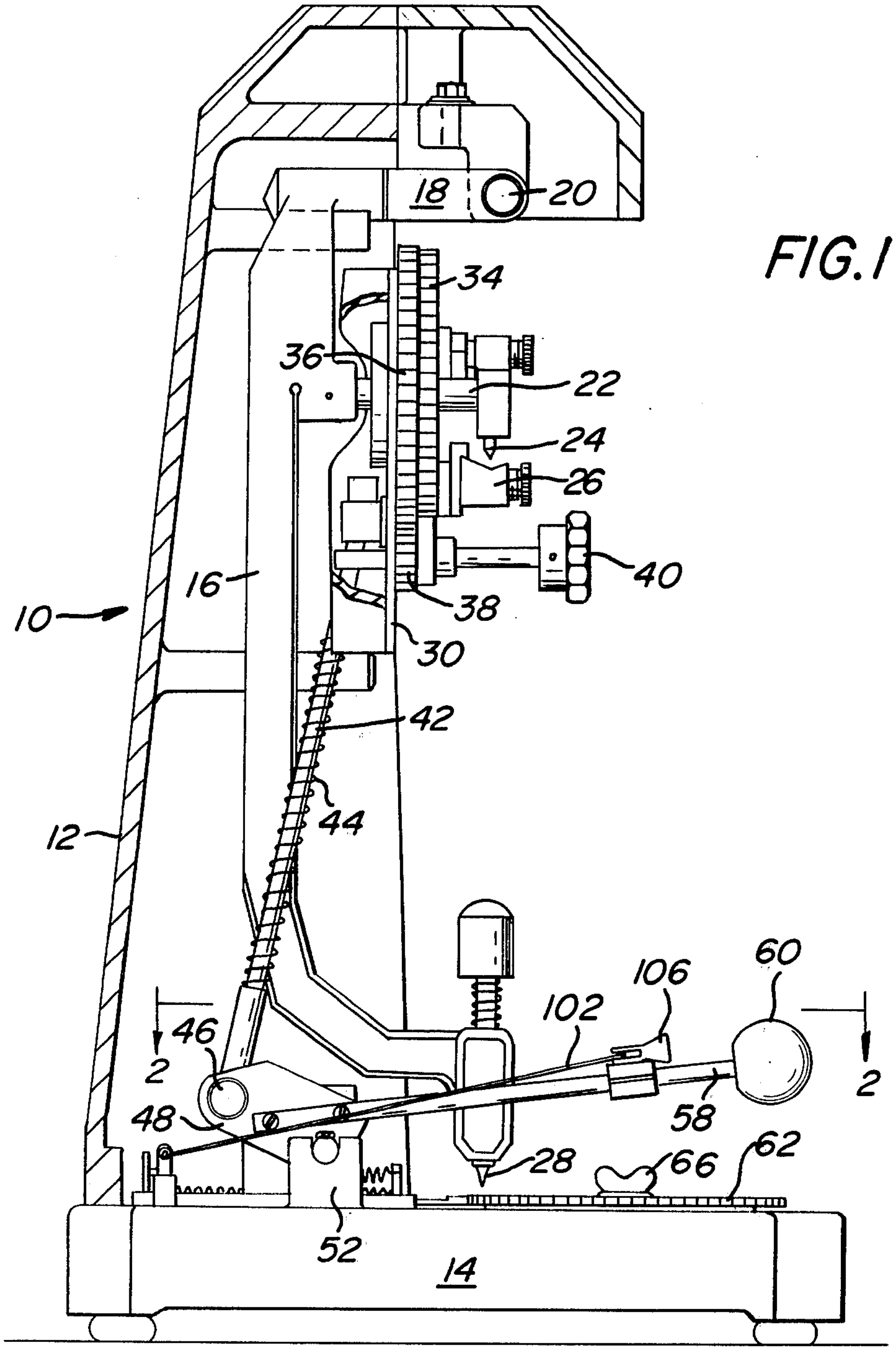
FIG. 1 is a vertical sectional view of apparatus in accordance with the present invention.

Referring to the drawings in detail, wherein like numerals indicate like elements, there is shown in FIG. 1 an engraving machine in accordance with the present invention designated generally as 10. The machine 10 includes a upright frame 12 mounted on a base 14.

The machine 10 includes a vertically disposed pantograph lever 16 which is rotatable about a horizontal axis corresponding to the longitudinal axis of axle 18 which in turn is rotatable about a horizontal axis corresponding to the axle 20. Since axles 18 and 20 are mutually perpendicular, the pantograph lever 16 has a universal swinging movement.

Intermediate its upper and lower ends, the pantograph lever 16 has an arm 22 parallel to the axle 18. The arm 22 supports an engraving tool 24 which projects radially downwardly therefrom toward the stylus 28 supported by the lower end of the pantograph lever 16.

The frame 12 supports a vertically disposed slide 30 for vertical movement. The slide 30 supports vertically disposed ratchet wheel 34 and gear 36. Each of slide 30, gear 36 and wheel 34 have an enlarged central hole through which the arm 22 extends. The ratchet wheel 34 supports a plurality of chuck jaws 26, preferably three in number. The chuck jaws 26 support the article to be engraved such as a wedding ring or bracelet. The chuck jaws 26 are slidable toward and away from the axis of arm 22, preferably in the manner as disclosed in detail in said U.S. Pat. No. 2,562,269. In that regard, a gear 38 is meshed with gear 36 and selectively rotatable by means of a manual knob 40. Thus, rotation of knob 40 in one direction causes the chuck jaws 26 to move radially inwardly and rotation of knob 40 in opposite direction causes the chucks 26 to move radially outwardly.

The slide 30 is movable upwardly and downwardly by means of a connecting rod 42 pivotably connected thereto at its upper end. A spring 44 surrounds the rod 42 and biases the rod downwardly in FIG. 1. The lower end of rod 42 is connected by way of a cross pin 46 to a carrier assembly designated generally as 48. The carrier assembly 48 is generally U-shaped in section as shown more clearly in FIGS. 3 and 4. The carrier assembly 48 is pivotably supported by a horizontally disposed shaft 50. Shaft 50 is rotatably supported by post 52 on the base 14.

The carrier assembly 48 includes a bight portion having parallel legs 54 and 56. An indexing lever 58 has one end removably bolted to the leg 56 of assembly 48. See FIGS. 2 and 4. The indexing lever 58 has an end portion adjacent carrier assembly 48 which is perpendicular to the axis of shaft 50 with the remainder being angularly disposed as shown in FIG. 2 and terminating in a knob 60.

The machine 10 includes one or more digit dials 62. In a preferred embodiment, there is provided a digit dial 62, for the alpabet in capital and lowercase letters and the numerals 0–9. Other digits such as a hyphen and/or ampersand may be provided as well as different styles of printing for the alphabet and the digits. Each dial 62 has peripheral notches 64. The base 14 is counterbored and provided with an annular bearing bushing 68. Dial 62 is removably coupled to the bushing 68 and rotatably supported thereby by means of a dial clamp 66.

Figure 2:
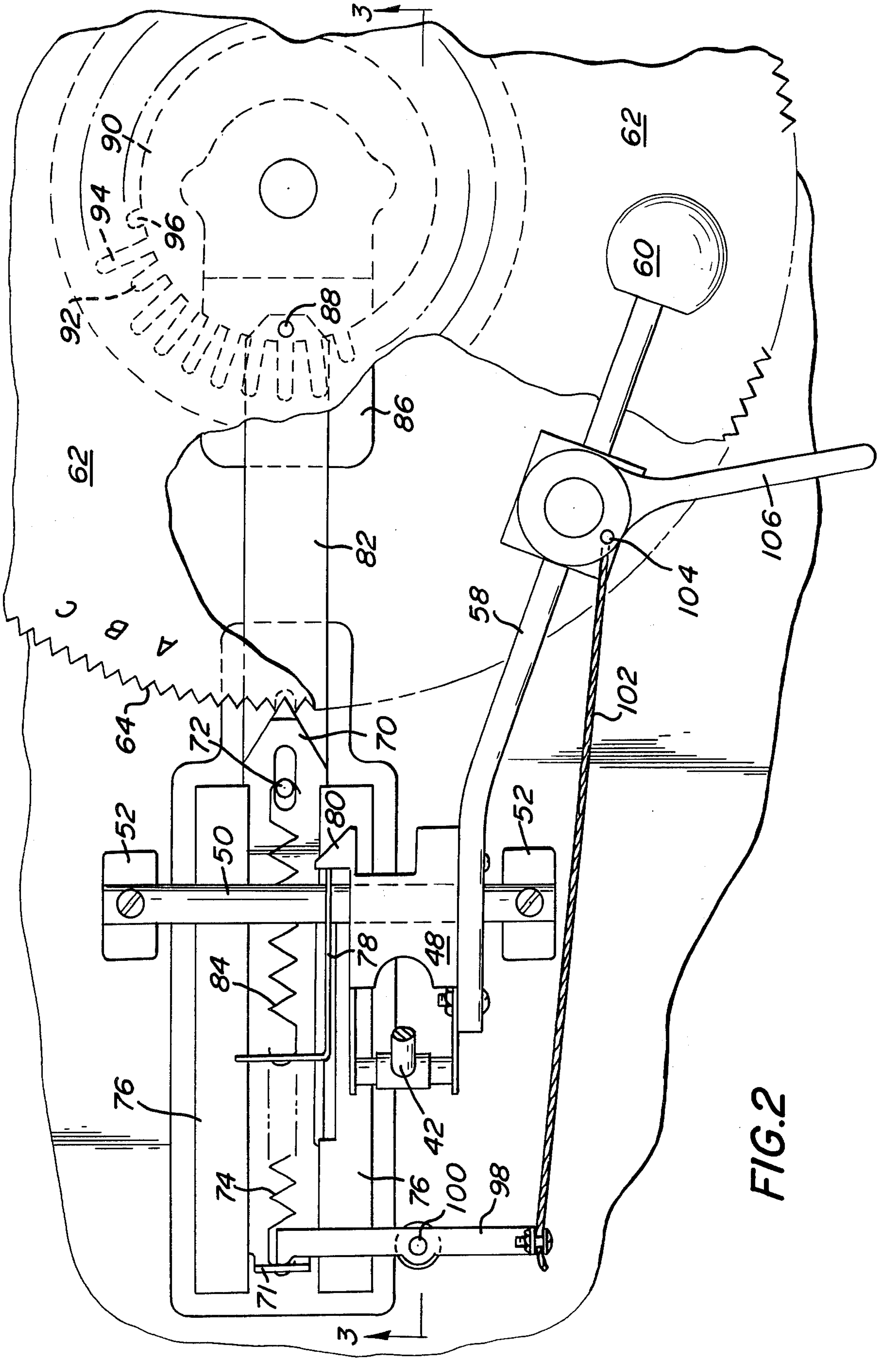
FIG. 2 is a sectional view taken along the line 2—2 in FIG. 1.
Figure 4:
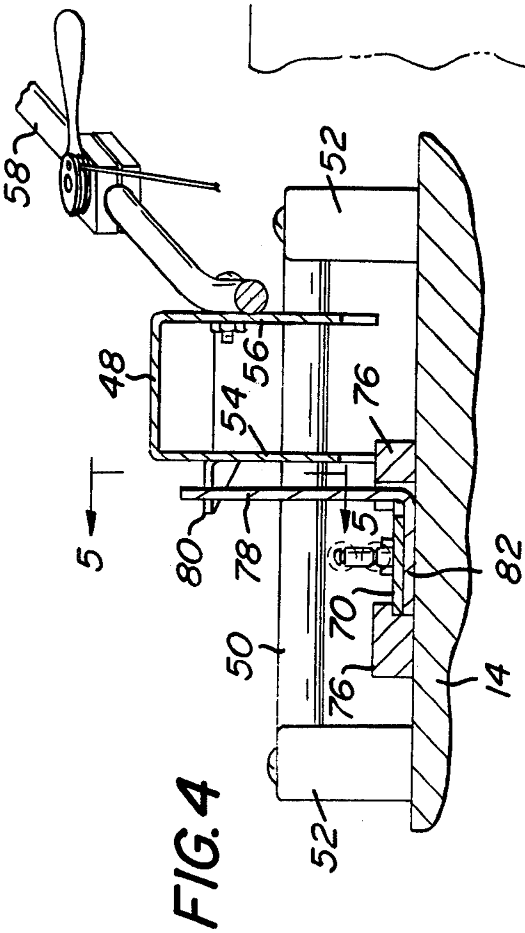
FIG. 4 is a sectional view taken along the line 4—4 in FIG. 3.
Figure 3:
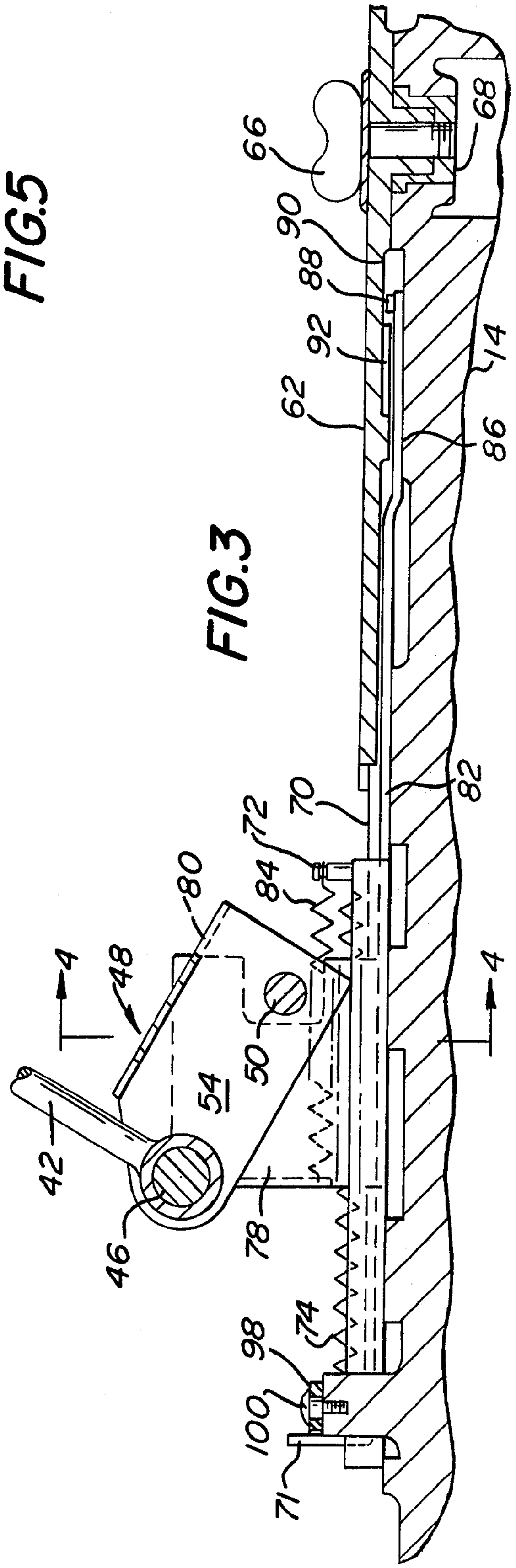
FIG. 3 is a sectional view taken along the line 3—3 in FIG. 2.

Referring to FIGS. 2–4, there is supported on the base 14 a locating plunger 70 guided for horizontal movement by guides 76. Plunger 70 has a pointed tip on one end which meshes with one of the notches 64 on the dial 62. At its other end, the plunger 70 has an upwardly extending tab 71. A coil spring 74 extends from tab 71 to a stationary post 72 secured to the base 14. Post 72 extends through a slot in the plunger 70. Spring 74 biases the plunger 70 into meshing contact with one of the notches 64.

Figure 5:
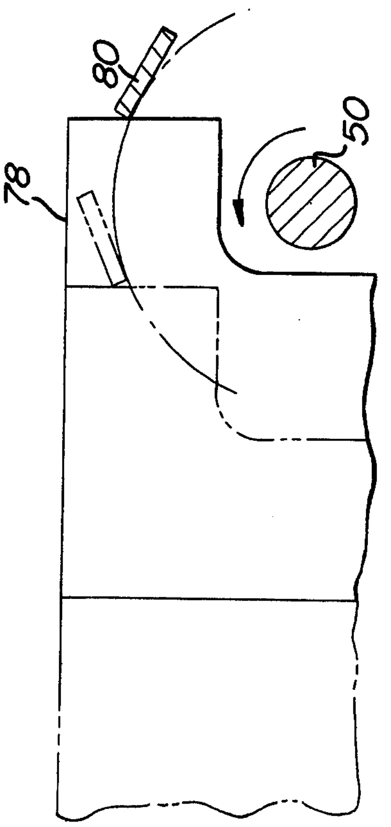
FIG. 5 is a sectional view taken along the line 5—5 in FIG. 4.

A tab extends upwardly from a horizontally disposed slide finger 82. As shown more clearly in FIG. 4, the slide finger 82 is below plunger 70. The carrier assembly 48 has an outwardly extending striker 80 positioned to contact the tab 78 and thereby cause sliding movement of the finger 82 while the assembly 48 rotates about the axis of shaft 50. See FIG. 5.

A spring 84 has one end secured to the stationary post 72. The other end of spring 84 is connected to an angled portion of the tab 78. Spring 84 biases the finger 82 toward the axis of dial 62. At its end adjacent the axis of dial 62, the finger 82 has an upwardly extending pin 88. The lower surface of the dial 62 is provided with a circle of grooves 92, 94, 96 of different lengths as shown in phantom in FIG. 2. The inner end of each groove is uniformly spaced from the axis of dial 62. Each of the grooves extends radially outwardly so as to be aligned with one of the digits engraved on the dial 62 adjacent the periphery thereof.

A short groove such as groove 96 would be opposite and aligned with a narrow letter such as the letter "I", an intermediate length groove such as groove 92 would be opposite a letter of the alphabet such as "A" while the longer grooves 94 would aligned with a letter of the alphabet such as "M". The length of the grooves 92, 94, 96 determines the length of the return stroke of the finger 82 as it moves from right to left in FIG. 2 which in turn will control the rotation of the ratchet wheel 34 by indexing pawl 108 so as to control the amount of rotary movement of the article to be engraved so that the space will be uniform between the engraved digits.

Referring to FIG. 2, an upstanding pin 100 on the base 14 pivotably supports a lever 98 intermediate its ends. One end of the lever 98 contacts the upstanding tab 71 on the plunger 70. The other end of the lever 98 removably interconnects with a wire 102. The other end of wire 102 is attached to a pin 104 on handle 106. Handle 106 is pivotably supported by a indexing lever 58. When the handle 106 is pivoted in a counterclockwise direction in FIG. 2, the plunger 70 slides from right to left and withdraws from one of the notches 64 on the dial 62.

Figure 6:
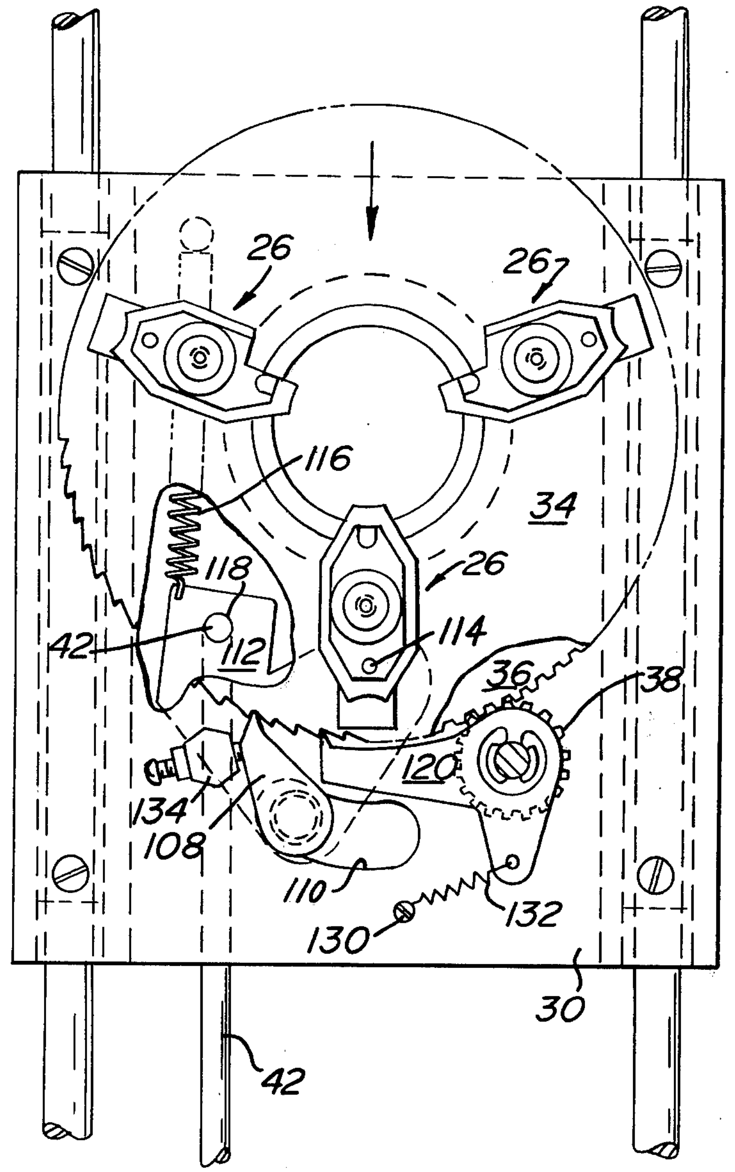
FIG. 6 is a front elevation view of the slide assembly.

Referring to FIG. 6, indexing pawl 108 engages one of the peripheral notches on ratchet wheel 34 and is mounted on a pin extending through the arcuate slot 110 in slide 30. The pawl 108 is connected to indexing arm 112 which pivots on slide 30 about axis 114. Spring 116 biases arm 112 clockwise in FIG. 6. Pin 118 on arm 112 is connected to the upper end of rod 42.

A retaining pawl 120 engages a peripheral notch on wheel 34 to prevent reverse rotation thereof. Pawl 120 is mounted on the shaft of knob 40. A spring 132 extends from pin 130 on slide 30 to pawl 120 thereby biasing pawl 120 clockwise in FIG. 6.

The indexing lever 58 of the present invention performs the three functions of indexing the article to be engraved for letter spacing, moving the article to be engraved relative to the engraving tool 24 for contact therewith, and for locking the dial 62 in a predetermined position for a selected digit thereon. In the prior art such as U.S. Pat. No. 2,562,269, when the operator moves the indexing lever 58 upwardly until it stops at a preset position, this moves the indexing pawl a predetermined number of teeth such as four teeth. When the index lever 58 is released, the indexing pawl will move the ratchet wheel 34 through an arc of four teeth. In the present invention, when the index lever 58 is elevated, pin 88 on finger 82 will enter one of the slots or grooves 92, 94 and 96. When the pin 88 bottoms out in the groove or slot aligned therewith, the indexing pawl will index wheel 34 a corresponding amount depending upon the width of the digit to be engraved. Sine the ratchet wheel 34 and the article to be engraved carried by jaws 26 thereon rotate through different arcs depending upon the width of the letter to be engraved, there will be uniform space between each letter.

When the operator desires to rotate the dial 62 to engrave a new letter, plunger 70 is withdrawn from one of the peripheral notches 64 by squeezing on handle 106 thereby causing it to rotate in a counterclockwise direction in FIG. 2. Spring 74 is expanded. When the operator has aligned the proper digit with the pointed end on plunger 70, he releases handle 106. Spring 74 contacts and causes the pointed end of plunger 70 to enter the desired notch 64 opposite the desired digit on the dial 62 to thereby lock dial 62 in place.

The operator then lifts up on indexing lever 58. As lever 58 moves up, assembly 48 pivots about shaft 50, rod 42 moves downwardly, and finger 82 moves radially outwardly with respect to dial 62. As pin 88 bottoms out in the groove 92, 94 or 96 associated with the selected digit to be engraved, lever 58 cannot move upwardly any further.

As the rod 42 moves downwardly, indexing pawl 108 is shifted along slot 110 counterclockwise in FIG. 6 for a distance of 2, 3 or 4 teeth corresponding to the length of the down stroke of rod 42. As pawl 108 moves, spring 116 expands. When lever 58 is released, rod 42 moves up, spring 116 contracts, and pawl 108 rotates wheel 34 to thereby rotate jaws 26 and the article to be engraved relative to tool 24. Spring 84 contracts and moves finger 82 radially inwardly of dial 62 so that pin 88 is withdrawn from the groove associated with the selected digit. Thereafter, the stylus 28 is used to trace the selected digit which is engraved by tool 24 in a conventional manner.

The present invention may be embodied in other specific forms without departing from the spirit or essential attributes thereof and, accordingly, reference should be made to the appended claims, rather than to the foregoing specification, as indicating the scope of the invention.

I claim:

1. An engraving machine for engraving on curved surfaces comprising a frame, an engraving tool supported by said frame, means on said frame for supporting an article to be engraved, and means on said frame for automatically causing relative rotary motion between said tool and said article supporting means as a function of the width of a digit to be engraved so that digits may be engraved by said tool with a uniform space between digits regardless of the width of the digits, said last mentioned means including a rotatable digit dial having radially disposed grooves, each groove being aligned with a digit on the dial, said grooves having different lengths as a function of the width of the digit aligned therewith, and said grooves starting at a uniform distance from the axis of rotation of said dial said last named means also including an actuator for rotating said supporting means, means connected to said actuator for engagement with one of said grooves for rotating said supporting means as a function of said one groove.

2. A machine in accordance with claim 1 including finger means extending along a radius of said dial and cooperating with one of said grooves for controlling the amount of arcuate movement of said article supporting means between acts of engraving a digit.

3. A machine in accordance with claim 2 wherein said finger means has a pin which enters one of said grooves as said finger means moves radially outwardly with respect to said dial.

4. In an engraving machine wherein an indexing lever controls the amount of rotation of means for supporting an article to be engraved between acts of engraving digits on the article, a rotatable dial containing digits to be engraved on the article, a stylus for tracing the digits on said dial, an engraving tool connected to said stylus, means for selectively locking the dial in a selected position while a digit is traced by said stylus, the improvement comprising means for automatically varying the amount of rotation of said article supporting means by said indexing lever as a function of the width of the digit to be engraved so that the space between engraved digits is uniform wherein said last mentioned means includes a finger member connected to said indexing lever and being reciprocal along a radius of said dial, and means on said dial limiting the extent of movement of said finger along said radius so that the length of such movement is short for narrow digits and longer for wide digits, whereby the movement of said indexing lever is limited by said finger and limiting means.

5. In a machine in accordance with claim 4 wherein said limiting means is a groove on said dial for each digit, each groove having a starting point spaced a uniform distance from the axis of said dial, some grooves having lengths longer than other grooves.

6. An engraving machine for automatically compensating for different widths of digits such as letters of the alphabet and/or numerals comprising:

(a) a frame supporting an engraving tool for engraving digits traced by a stylus and means operatively associated with said tool for holding an article to be engraved, (b) a rotatable dial on said frame, said dial having digits circumferentially disposed thereon, said dial having radially disposed grooves, each groove being aligned with one of said digits, said grooves being of different radial length as a function of the width of said digits, one end of each of said grooves being uniformly spaced from the axis of said dial, (c) first means for selectively locking the dial against rotation while a digit on the dial is traced by the stylus, (d) a slide finger radially disposed with respect to said dial and having a pin positioned to enter one of said grooves as said slide finger moves radially with respect to said dial, (e) an actuator coupled to said slide finger and article holding means for moving:

(i) said slide finger radially of said dial, (ii) causing relative movement between said engraving tool and said article holding means, (iii) and for rotating the article holding means relative to said frame through an arc directly related to the length of said groove.

7. A machine in accordance with claim 6 wherein said slide finger is biased radially inwardly of said dial, said actuator including an indexing lever coupled to said finger to move said finger radially outwardly in opposition to said bias.

8. An engraving machine in accordance with claim 6 wherein said means for locking the dial includes a plunger having a pointed tip adapted to enter a notch on the periphery of said dial, said dial having a notch aligned with each digit, a handle on said lever, said handle being coupled to said plunger for moving said plunger radially outwardly to remove said tip from a notch so that the dial may be rotated.

* * * * *